United States Patent [19]

Boudot et al.

[11] Patent Number: 4,750,746

[45] Date of Patent: Jun. 14, 1988

[54] DEVICE FOR ATTACHING A SEAL MEMBER TO A SHAFT

[75] Inventors: Jean Claude M. Boudot, Hericy; Jacky Naudet, Evry, both of France

[73] Assignee: Societe Nationale d'Etude et de Construction de Moteurs d'Aviation (SNECMA), France

[21] Appl. No.: 91,451

[22] Filed: Aug. 31, 1987

[30] Foreign Application Priority Data

Sep. 17, 1986 [FR] France ............................ 86 12970

[51] Int. Cl.$^4$ ...................... F16J 15/30; F04D 29/12
[52] U.S. Cl. .................................. 277/12; 277/133; 277/142; 277/166; 415/170 R
[58] Field of Search .................. 277/12, 32, 133, 134, 277/138, 142, 155, 166, DIG. 8; 415/115, 170 R, 170 A, 174

[56] References Cited

U.S. PATENT DOCUMENTS

| 1,033,237 | 7/1912 | De Ferranti | 415/172 A X |
| 4,294,454 | 10/1981 | Cannings | 277/DIG. 8 X |
| 4,551,064 | 11/1985 | Pask | 415/115 X |
| 4,650,395 | 3/1987 | Weidner | 415/174 X |

FOREIGN PATENT DOCUMENTS

| 59-5807 | 1/1984 | Japan | 415/170 R |
| 755290 | 8/1956 | United Kingdom | 415/174 |
| 2103294 | 2/1983 | United Kingdom | 415/174 |

*Primary Examiner*—Robert S. Ward
*Attorney, Agent, or Firm*—Bacon & Thomas

[57] ABSTRACT

A device for attaching a seal to a shaft wherein the seal is mounted on a hoop which, in turn, is mounted on the end of a shaft. A second, resilient hoop member is interposed between the seal and a flange on the shaft to exert a compressive force on the seal. A split ring member engages circumferential grooves formed on the shaft and the first hoop member to prevent relative axial movement. A pin attached to the hoop member engages a notch on the split ring member to prevent any relative circumferential motion between these elements.

19 Claims, 3 Drawing Sheets

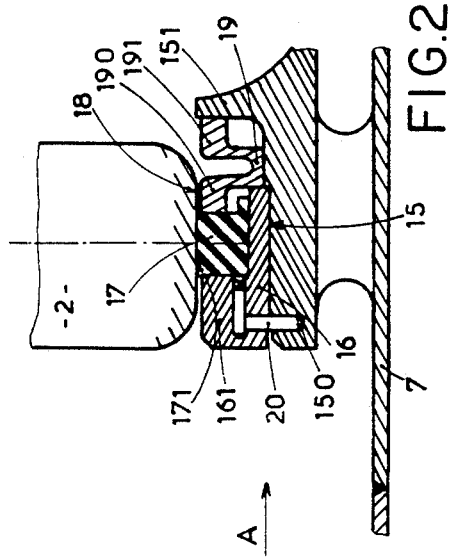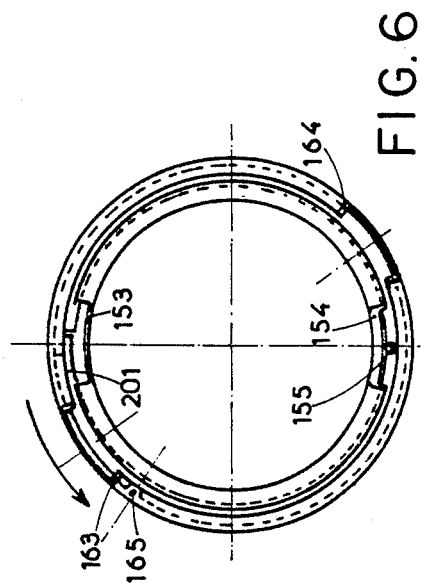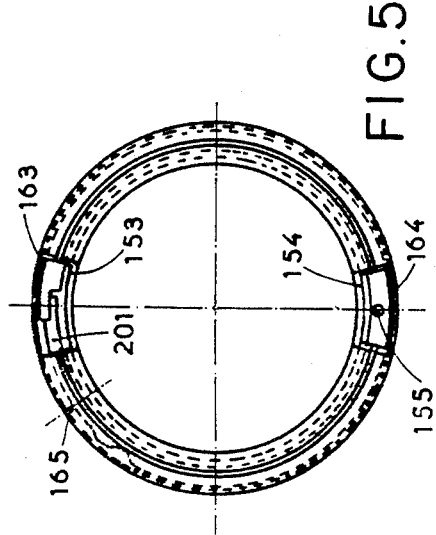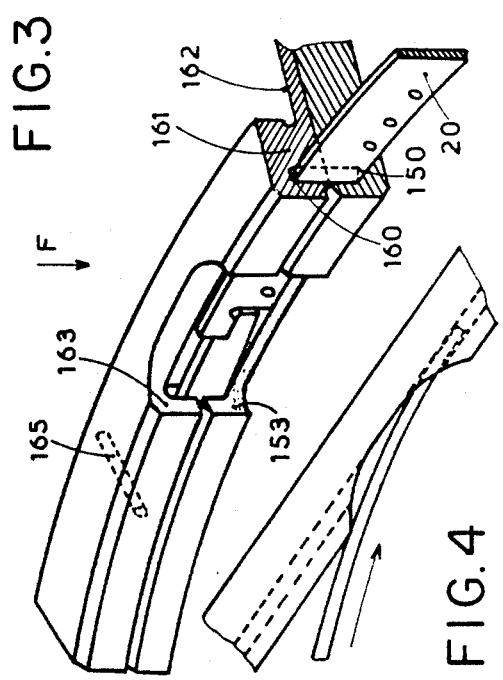

DEVICE FOR ATTACHING A SEAL MEMBER TO A SHAFT

BACKGROUND OF THE INVENTION

The present invention relates to a device for fastening a seal to the end of a shaft to effect a seal between the shaft and the bore of a circular element encircling the shaft. The invention finds particular usage in gas-turbine engines to seal the area between a bore of a turbine wheel and an engine shaft passing through the wheel.

Presently, an O-ring or an annular seal with a square cross section is utilized in such installations and is maintained on the shaft by a pair of rings and a nut screwed onto a thread formed on the end of the shaft. However, this system requires additional locking means to lock the nut onto the shaft so as to prevent loosening of the seal. This system is also bulky, heavy and requires a thread to be formed on the shaft thereby increasing the manufacturing costs. When such a system is utilized on a gas-turbine engine shaft, in particular turbojet engines for aircraft, the fastening means must be carefully designed to assure reliable locking, thus increasing the design and manufacturing costs.

It is also known to hold the rings in place on the shaft by a circular spring clip which engages a groove formed on the shaft. This method of fastening is only suitable for relatively small diameter shafts and permits the rotation of the seal with respect to the shaft. This is impermissible on the shaft of a gas-turbine engine due to its increasing the wear of the seal and the possibility of producing undesirable vibrations during engine operation.

SUMMARY OF THE INVENTION

It is an object of the present invention to replace the known seal fastening systems by a device which requires no complex machining of either the shaft or the surrounding structure, and one which is reliable while being simple and easy to use.

The device according to the invention comprises a flanged hoop member having a substantially cylindrical portion which is slidably received on the end of the shaft and on which is mounted an annular seal such that one side of the seal is in contact with the flange. A second hoop member is disposed around the shaft between a second side of the annular seal and a radial flange formed on the shaft. The second hoop member may be formed of resilient material and may be slightly compressed so as to exert an axial force on the seal. Locking means are utilized between the first hoop member and the shaft to prevent any relative axial movement between these elements.

The locking means may comprise a split ring which is inserted into first and second circumferential grooves formed in the shaft and the first hoop member, respectively. The radial dimension of the split ring is such that it engages both of the slots to prevent relative axial movement between the first hoop member and the shaft.

The split ring member defines a notch in its outer periphery so as to engage a pin extending through the circumferential groove in the first hoop member. Manual rotation of the hoop member relative to the split ring member enables the pin to engage the notch and to prevent any further rotational movement between the first hoop member and the split ring.

The first hoop member and the shaft each define axially facing openings to permit the insertion of the split ring into the first and second circumferential grooves. The openings communicate with the grooves such that one end of the split ring member may be displaced from the plane of the member and inserted into the grooves. Subsequent turning of the split ring causes it to be inserted into the first and second circumferential grooves.

Second axial openings may be formed in the first tube member and the shaft located diametrically opposite of the first of such openings to facilitate the insertion of the split ring member. The second openings enable the use of a tool which engages one of a plurality of holes formed in the split ring member to assist in turning the member relative to the shaft and the first hoop member.

It is another object of the invention to provide a gas-turbine engine having at least one turbine wheel defining a bore through which an engine shaft passes and which incorporates the seal to prevent gas leakage between the juncture of the wheel and the shaft. In cases in which the device is utilized to attach a static seal, the outer periphery of the seal may directly contact the bore of the rotor wheel. If there is relative rotation between the rotor wheel and the shaft, thereby causing dynamic sealing between the elements, a ring may be removably attached to the turbine rotor wheel to bear against the annular seal. By using the removable ring, the necessity of replacing the entire rotor wheel when the sealing surface becomes worn is eliminated. Under these circumstances, only the annular ring need be replaced.

BRIEF DESCRIPTION OF THE DRAWINGS

FIG. 2 is an enlarged, partial cross sectional view of detail II shown in FIG. 1.

FIG. 3 is a partial, perspective view of the sealing device according to the invention.

FIG. 4 is a partial, top view of the sealing device according to the invention during insertion of the split ring member into the circumferential grooves.

FIG. 5 is a partial, end view of the sealing ring according to the invention taken in the direction of arrow A in FIG. 2.

FIG. 6 is a partial, end view similar to FIG. 5 after the first hoop member has been rotated to engage its pin with the notch formed in the split ring member.

DETAILED DESCRIPTION OF THE PREFERRED EMBODIMENTS

Figure 1:
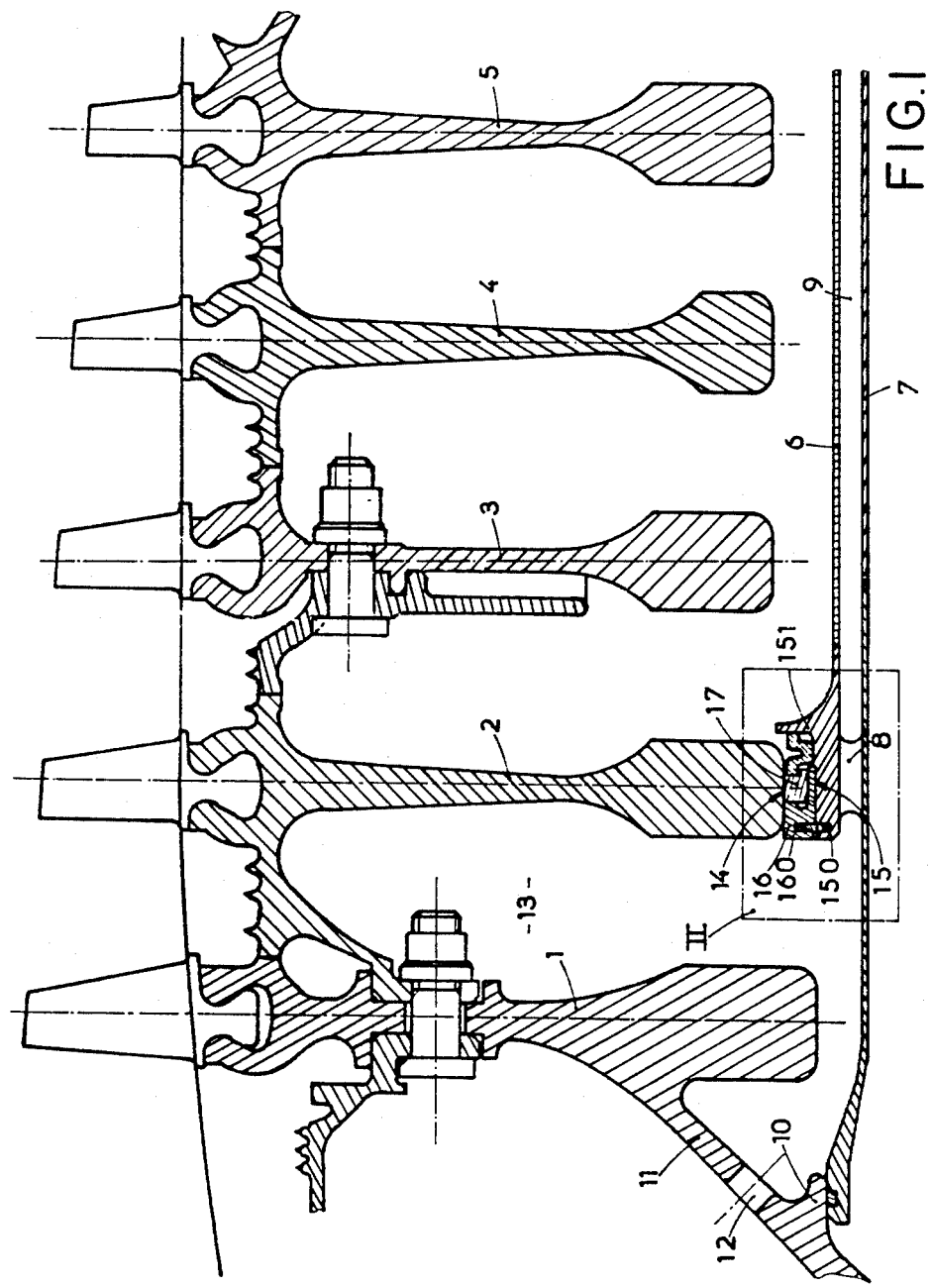
FIG. 1 is a partial, longitudinal cross sectional view of a high-pressure compressor of a gas-turbine engine incorporating the seal device according to the invention.

FIG. 1 shows a cross-sectional view of a high-pressure compressor of a gas-turbine engine with the rotor wheels 1 through 5 having turbine blades mounted thereon in known fashion. The rotor wheels are driven in known fashion by concentric shafts 6 and 7 which are, in turn, driven by a turbine (not shown) which is located downstream of a combustion chamber (not shown) of the turbine engine. Outer shaft 6 is rigidly attached to inner shaft 7 by welds 8 at several points around the periphery of shaft 7. Annular channel 9 is defined between the shafts 6 and 7. Upstream end of shaft 7 is attached to flange 10 formed on frusto-conical collar 11 which is formed on the upstream side of rotor wheel 1. An O-ring seal may be interposed between the upstream end of shaft 7 and the flange 10 as shown.

Collar 11 defines a plurality of orifices 12 to allow air from the upstream portion of the engine to enter chamber 13 defined between rotor wheels 1 and 2, the collar 11 and the shaft 7 to cool rotor wheel 1 and prevent it from overheating. Air also enters annular chamber 9 to pressurize space between the turbine wheels (not shown) located downstream from the compressor.

A sealing device is placed between bore 14, formed in rotor disk 2, and the upstream end of the outer shaft 6 to prevent the air from dispersing into the space between the rotor wheels 2 through 5. The sealing device is shown in detail II in FIG. 1 and FIGS. 2–8.

As best seen in FIGS. 2 and 3, the upstream end of shaft 6 defines a cylindrical bearing surface 15 with an adjacent flange 151 extending radially outwardly from the periphery of shaft 6. Cylindrical bearing surface 15 defines a first circumferentially extending slot 150 which opens radially outwardly.

A first hoop member 16 is slidably received on bearing surface 15 and comprises substantially cylindrical portion 162 and a radial flange portion 161. Annular seal member 17 rests on cylindrical portion 162 such that an upstream surface of cylindrical seal 17 bears against flange portion 161. Sealing surface 171 bears against the inner bore surface 18 of the rotor wheel 2 to effectively seal this juncture. The seal 17 can be made of any known sealing material, such as carbon, etc.

A second hoop member 19 is interposed between the downstream side of seal 17 and radial flange 151. Hoop member 19 may be formed of resilient material and have a generally "U" shaped cross section with upstream flange 190 and downstream flange 191 extending therefrom in an axial direction. Upstream flange 190 bears against the downstream surface of seal member 17, while downstream flange 191 bears against radial flange 151. The resiliency of second hoop member 19 serves to exert an axially compressing force on the seal 17.

First hoop member 16 also defines a circumferentially extending slot 160 which opens radially inwardly in substantial axial alignment with slot 150 formed at the end of shaft 6. The end of shaft 6 and the hoop member 16 also define axial openings 153 and 163, respectively, which communicate with the circumferential slots 150 and 160, as illustrated best in FIGS. 3 and 4. Hoop member 16 is prevented from axially moving with respect to shaft 6 by split ring member 20. Split ring member 20 is inserted into the grooves 150 and 160 through the axial openings 153 and 163 as shown in FIG. 4. One end of the split ring member 20 is placed into the grooves and the member is rotated until it is entirely within grooves 150 and 160.

Hoop member 16 and shaft 6 may also define second axial openings 164 and 154, respectively, as noted in FIG. 5, which are substantially diametrically opposite the first axial openings 153 and 163. Split ring member 20 defines a plurality of axially extending openings 205 which may be engaged by a too, through the second axial openings 154 and 164, to assist in the insertion of the split ring member into the grooves 150 and 160. As noted in FIGS. 2 and 7, split ring 20 when engaging grooves 150 and 160 will prevent any axial movement between hoop member 16 and shaft 6.

Split ring member 20 tapers from a first end 200 toward the second end 201 both in regards to its axial thickness and its radial height such that the two ends overlap to form a bayonet joint 202. The ring defines a radial notch 203 displaced from end 201 adjacent to a step portion 204.

Axial pin 165 is inserted into the hoop member 16 such that is passes through a portion of circumferential groove 160. The inter-engagement of pin 165 with notch 203 in the split ring member 20 serves to affix these elements together so as to prevent any relative rotation therebetween.

Split ring member 20 may be rotationally locked to shaft 6 by insertion of a pin through hole 155 formed in the end of shaft 6 and one of the holes 205 aligned therewith in split ring member 20.

The device according to the invention is assembled by first placing second hoop member 19 onto the cylindrical bearing surface 15 of shaft 6 until downstream flange 191 bears against radial flange 151. Seal member 17 is placed on cylindrical portion 162 of hoop member 16 (which has been previously assembled with pin 165) and hoop member 16 is mounted on the bearing surface 15 of the shaft 6. These elements are located such that axial openings 153 and 163 are in alignment with each other, while second axial openings 154 and 164 are in alignment with each other as shown in FIG. 5.

The tapered end portion 201 of split ring member 20 is inserted through axial openings 153 and 163 into the circumferential slots 150 and 160. Subsequent rotation of the split ring member 20 serves to place this member completely within grooves 150 and 160 until it is in the location shown in FIG. 5. This serves to axially lock the seal member 17 in its desired position.

In order to rotationally lock the device, a pin is inserted through one of the holes 205 which is in alignment with hole 155 formed at the end of shaft 6. As shown in FIG. 5, hoop member 16 is then rotated in a counterclockwise direction until pin 165 snaps into notch 203. This serves to lock hoop member 16 with split ring member 20. The pin extending into opening 155 may then be withdrawn and the combination of hoop member 16 and split ring member 20 can be further rotated such that the ends of split ring member 20 are not longer aligned with opening 153. The axial openings 163 and 164 will be circumferentially offset from corresponding axial openings 153 and 154, respectively, to prevent any possibility of the split ring member 20 coming out of the grooves 150 and 160, even if the hoop member 16 and split ring 20 should rotate during operation of the gas-turbine engine.

The fastening device according to the invention may be disassembled by pressing the tapered end portion 201 radially inwardly to allow pin 165 to be displaced from recess 203 and rotating hoop member 16 in a clockwise direction. The remainder of the disassembly is in reverse order of the assembly procedure noted above.

Figure 7:
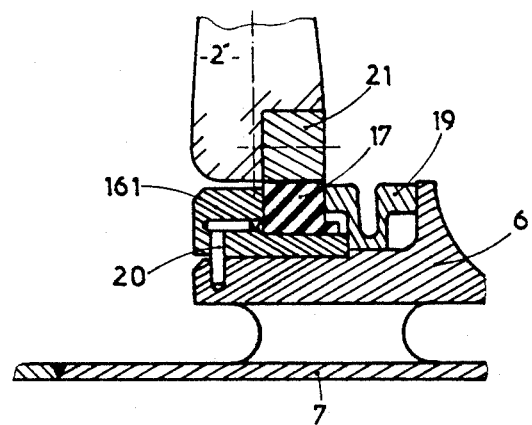
FIG. 7 is an enlarged, partial sectional view similar to FIG. 2, showing the invention utilized with a dynamic seal.
Figure 8:
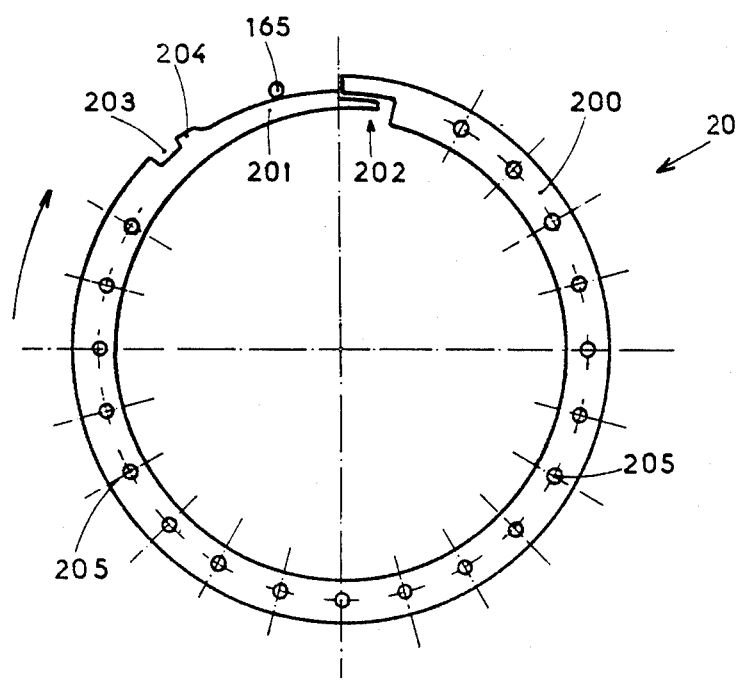
FIG. 8 is a plan view of the split ring member utilized in the attaching device according to the invention.

FIG. 7 shows a partial, cross sectional view of the invention utilized where dynamic sealing conditions exist between the rotor wheel 2' and the shaft 6. This may be conditions where either one of the elements is stationary or where there is relatively different rotational speeds between these elements. In this instance rotor wheel 2' rotates at a different speed from the shaft and, under such conditions, the bore of the rotor wheel 2' would eventually enlarge, such that a seal would no longer be possible. Since the cost of replacing the entire rotor wheel 2' is prohibitably expensive, the rotor wheel is modified to include a replaceable seal element. Ring 21 is removably attached to rotor wheel 2' and bears against the sealing surface of seal member 17. The ring may be attached by rivets or screws such that, when its inner surface is worn to the point where the seal is no longer effective, only the ring 21 need be replaced.

The foregoing description has been provided for illustrative purposes only and should not be construed as in any way limiting this invention, the scope of which is defined solely by the claims appended hereto.

What is claimed is:

1. A device for fastening an annular seal to a shaft comprising:
   (a) a bearing surface formed on a portion of an exterior surface of the shaft;
   (b) a first radial flange on the shaft extending in a generally radially outward direction from the exterior surface of the shaft adjacent to the bearing surface;
   (c) a first circumferential slot defined by the shaft;
   (d) a first hoop member having a substantially cylindrical portion adapted to be slidably mounted on the bearing surface, and a second radially outwardly extending flange portion, the hoop member defining a second circumferential slot in substantial axial alignment with the first circumferential slot;
   (e) an annular seal located on the cylindrical portion of the first hoop member and bearing against the second radial flange;
   (f) a second hoop member interposed between the annular seal and the first flange; and,
   (g) locking means to lock the first hoop member onto the shaft so as to prevent relative axial movement therebetween.

2. The fastening device according to claim 1 further comprising first axially facing openings defined by the shaft and the first hoop member communicating with the first and second circumferential grooves.

3. The fastening device according to claim 2 wherein the locking means comprises a split ring member engaging the first and second circumferential grooves.

4. The fastening device according to claim 3 further comprising:
   (a) a radially tapered portion formed on an end of the split ring member;
   (b) a notch defined by the split ring member; and,
   (c) a substantially axially extending pin mounted in the first hoop member extending across the second circumferential grooves so as to engage the notch to prevent relative rotation between the first hoop member and the split ring.

5. The fastening device according to claim 4 further comprising means to attach the split ring member to the shaft so as to prevent relative rotation therebetween.

6. The fastening device according to claim 5 wherein the attaching means comprises:
   (a) at least one substantially axially extending first hole defined by the split ring member;
   (b) a substantially axially extending second hole defined by the shaft; and,
   (c) a second pin adapted to extend into the first and second holes.

7. The fastening device according to claim 3 further comprising a plurality of substantially axially extending holes defined by the split ring member adapted to engage a tool to assist in the insertion of the split ring member into the first and second circumferential grooves.

8. The fastening device according to claim 3 further comprising second axially facing openings defined by the shaft and the first hoop member communicating with the first and second circumferential grooves, the second openings being located substantially diametrically opposite the first axially facing openings.

9. The fastening device according to claim 1 wherein the second hoop member comprises:
   (a) an annular portion having a substantially "U" shaped cross-section;
   (b) a first axial flange extending from a first side of the annular portion so as to bear against the seal; and,
   (c) a second axial flange extending from a second side of the annular portion so as to bear against the first radial flange.

10. In a gas-turbine engine having at least one rotor turbine wheel with a bore extending around an engine shaft, the improved device for effecting a seal between the rotor wheel and the shaft comprising:
    (a) a bearing surface formed on a portion of an exterior surface of the shaft;
    (b) a first radial flange on the shaft extending in a generally radially outward direction from the exterior surface of the shaft adjacent to the bearing surface;
    (c) a first circumferential slot defined by the shaft;
    (d) a first hoop member having a substantially cylindrical portion adapted to be slidably mounted on the bearing surface, and a second axially outwardly extending flange portion, the hoop member defining a second circumferential slot in substantial axial alignment with the first circumferential slot;
    (e) an annular seal located on the cylindrical portion of the first hoop member and bearing against the second flange;
    (f) a second hoop member interposed between the annular seal and the first flange; and,
    (g) locking means to lock the first hoop member onto the shaft so as to prevent relative axial movement therebetween.

11. The improved gas turbine engine according to claim 10 further comprising a ring removably attached to the turbine wheel so as to bear against the annular seal.

12. The improved gas turbine engine according to claim 11 further comprising first axially facing openings defined by the shaft and the first hoop member communicating with the first and second circumferential grooves.

13. The improved gas turbine engine according to claim 12 wherein the locking means comprises a split ring member engaging the first and second circumferential grooves.

14. The improved gas turbine engine according to claim 13 further comprising:
    (a) a radially tapered portion formed on an end of the split ring member;
    (b) a notch defined by the split ring member; and,
    (c) a substantially axially extending pin mounted in the first hoop member extending across the second circumferential groove so as to engage the notch to prevent relative rotation between the first hoop member and the split ring.

15. The improved gas turbine engine according to claim 14 further comprising means to attach the split ring member to the shaft so as to prevent relative rotation therebetween.

16. The improved gas turbine engine according to claim 15 wherein the attaching means comprises:
(a) at least one substantially axially extending first hole defined by the split ring member;
(b) a substantially axially extending second hole defined by the shaft; and,
(c) a second pin adapted to extend into the first and second holes.

17. The improved gas turbine engine according to claim 13 further comprising a plurality of substantially axially extending holes defined by the split ring member adapted to engage a tool to assist in the insertion of the split ring member into the first and second circumferential grooves.

18. The improved gas turbine engine according to claim 13 further comprising second axially facing openings defined by the shaft and the first hoop member communicating with the first and second circumferential grooves, the second openings being located substantially diametrically opposite the first axially facing openings.

19. The improved gas turbine engine according to claim 11 wherein the second hoop member comprises:
(a) an annular portion having a substantially "U" shaped cross-section;
(b) a first axial flange extending from a first side of the annular portion so as to bear against the seal; and,
(c) a second axial flange extending from a second side of the annular portion so as to bear against the first radial flange.

* * * * *

UNITED STATES PATENT AND TRADEMARK OFFICE
CERTIFICATE OF CORRECTION

PATENT NO. : 4,750,746

DATED : June 14, 1988

INVENTOR(S) : BOUDOT ET AL

It is certified that error appears in the above-identified patent and that said Letters Patent is hereby corrected as shown below:

In Column 4, line 45, "not" should be --no--.

In Column 4, line 68, "prohibitably" should be --prohibitively--.

. In Column 5, line 5, "not" should be --no--.

Signed and Sealed this

Thirteenth Day of December, 1988

Attest:

DONALD J. QUIGG

Attesting Officer

Commissioner of Patents and Trademarks